United States Patent
Zerdoum et al.

(10) Patent No.: US 9,934,117 B2
(45) Date of Patent: Apr. 3, 2018

(54) APPARATUS AND METHOD FOR FAULT DETECTION TO ENSURE DEVICE INDEPENDENCE ON A BUS

(71) Applicant: Honeywell International Inc., Morristown, NJ (US)

(72) Inventors: Kamel Zerdoum, Chalfont, PA (US); Paul Gerhart, Lansdale, PA (US)

(73) Assignee: Honeywell International Inc., Morris Plains, NJ (US)

( * ) Notice: Subject to any disclaimer, the term of this patent is extended or adjusted under 35 U.S.C. 154(b) by 210 days.

(21) Appl. No.: 14/667,476

(22) Filed: Mar. 24, 2015

(65) Prior Publication Data

US 2016/0283299 A1    Sep. 29, 2016

(51) Int. Cl.
| | |
|---|---|
| *G06F 11/22* | (2006.01) |
| *G06F 13/42* | (2006.01) |
| *G06F 13/00* | (2006.01) |
| *G06F 12/06* | (2006.01) |
| *G06F 3/06* | (2006.01) |

(52) U.S. Cl.
CPC ........ *G06F 11/2221* (2013.01); *G06F 3/0629* (2013.01); *G06F 11/22* (2013.01); *G06F 12/0646* (2013.01); *G06F 12/0684* (2013.01); *G06F 13/00* (2013.01); *G06F 13/4282* (2013.01); *G06F 13/4291* (2013.01)

(58) Field of Classification Search
CPC .. G06F 11/22; G06F 11/2221; G06F 13/4282; G06F 13/4291; G06F 13/00; G06F 12/0646; G06F 12/0684; G06F 3/0629
See application file for complete search history.

(56) References Cited

U.S. PATENT DOCUMENTS

| 3,384,873 A | * | 5/1968 | Sharma | ................ G08B 3/1008 |
| | | | | 340/9.17 |
| 3,868,641 A | * | 2/1975 | Hagelin | ................... B61L 7/10 |
| | | | | 246/28 R |
| 4,017,829 A | * | 4/1977 | Sternat | ................ G06F 11/1497 |
| | | | | 714/32 |
| 4,165,533 A | * | 8/1979 | Jonsson | ................ G11C 29/02 |
| | | | | 714/53 |

(Continued)

OTHER PUBLICATIONS

LogiCORE IP AXI Serial Peripheral Interface (AXI SPI)(v1.01a). Jul. 6, 2011. Xilinx, Inc.*

(Continued)

*Primary Examiner* — Paul Contino

(57) ABSTRACT

A method includes transmitting a first value to a first slave device via a communication bus, where the first value is within a first range of values associated with the first slave device. The method also includes receiving a second value via the communication bus and detecting a fault when the second value is not within the first range of values associated with the first slave device. Detecting the fault could include detecting a decoder fault when the second value is within a second range of values associated with a second slave device. The method may further include detecting a fault when the second value is within the first range of values associated with the first slave device but does not equal the first value or detecting no fault when the second value equals the first value.

20 Claims, 6 Drawing Sheets

(56) References Cited

U.S. PATENT DOCUMENTS

| | | | | | |
|---|---|---|---|---|---|
| 4,597,082 | A * | 6/1986 | Hill | ............................ | H04B 3/56 375/222 |
| 5,483,518 | A * | 1/1996 | Whetsel | ............ | G01R 31/2815 324/73.1 |
| 5,966,306 | A * | 10/1999 | Nodine | ..................... | H04L 1/24 700/121 |
| 6,542,948 | B1 * | 4/2003 | Munz | ................. | G01R 31/3004 710/110 |
| 6,662,242 | B2 * | 12/2003 | Holm | .................. | G06F 12/0684 710/10 |
| 6,820,149 | B2 * | 11/2004 | Moy | ..................... | G06F 11/221 710/104 |
| 7,010,666 | B1 * | 3/2006 | Barber | .................. | G06F 12/063 711/220 |
| 7,042,984 | B2 * | 5/2006 | Karl | ......................... | H04M 3/24 379/12 |
| 7,761,633 | B2 * | 7/2010 | Devila | ................ | G06F 13/4291 340/9.1 |
| 7,809,861 | B1 * | 10/2010 | Pritchard | .............. | G06F 13/368 710/316 |
| 7,984,202 | B2 * | 7/2011 | Hofmann | ............ | G06F 13/1621 710/110 |
| 8,891,298 | B2 * | 11/2014 | Rao | .................... | G11C 16/3495 365/148 |
| 9,213,866 | B1 * | 12/2015 | Ahmad | .................... | G06F 21/76 |
| 9,672,094 | B1 * | 6/2017 | Nitzan | .................. | G06F 11/079 |
| 2002/0152344 | A1 * | 10/2002 | Holm | ..................... | G06F 9/45541 710/260 |
| 2003/0093604 | A1 * | 5/2003 | Lee | ..................... | G06F 11/0745 710/302 |
| 2003/0135683 | A1 * | 7/2003 | Moy | ..................... | G06F 11/221 710/305 |
| 2003/0177220 | A1 * | 9/2003 | Ohara | .................. | H04L 29/1232 709/223 |
| 2004/0158333 | A1 * | 8/2004 | Ha | .......................... | H04B 3/542 700/3 |
| 2004/0208029 | A1 * | 10/2004 | Caruthers | .............. | G08C 19/00 363/72 |
| 2005/0114616 | A1 * | 5/2005 | Tune | ................... | G06F 12/1441 711/163 |
| 2006/0259736 | A1 * | 11/2006 | Carver | .................. | G06F 9/3861 711/220 |
| 2008/0084862 | A1 * | 4/2008 | Oliver | .................... | G06F 13/385 370/350 |
| 2008/0123677 | A1 * | 5/2008 | Cooley | .................... | H04L 69/08 370/419 |
| 2008/0183928 | A1 * | 7/2008 | Devila | ................ | G06F 13/4291 710/110 |
| 2008/0307145 | A1 * | 12/2008 | Goren | ................... | G06F 13/405 710/307 |
| 2009/0037779 | A1 * | 2/2009 | Kawakami | ............ | G06F 13/385 714/48 |
| 2009/0083585 | A1 * | 3/2009 | Liu | ......................... | G06F 11/26 714/43 |
| 2010/0091684 | A1 * | 4/2010 | Winter | .............. | H04L 29/12264 370/254 |
| 2010/0131801 | A1 * | 5/2010 | Baleani | ............... | G06F 11/1641 714/37 |
| 2010/0229077 | A1 * | 9/2010 | Sugita | ..................... | G06F 11/10 714/807 |
| 2010/0235680 | A1 * | 9/2010 | Fey | ..................... | G06F 11/1641 714/15 |
| 2011/0035636 | A1 * | 2/2011 | Lu | ....................... | G11C 29/1201 714/719 |
| 2011/0320887 | A1 * | 12/2011 | Craddock | ........... | G06F 11/0745 714/49 |
| 2012/0072628 | A1 * | 3/2012 | Crockett | ............. | G06F 13/4291 710/110 |
| 2013/0111283 | A1 * | 5/2013 | Zhang | .............. | G11C 29/56004 714/719 |
| 2013/0242749 | A1 * | 9/2013 | Herz | .................. | G06F 11/0745 370/241 |
| 2013/0290582 | A1 * | 10/2013 | Kothamasu | ........... | G06F 13/404 710/110 |
| 2014/0025852 | A1 * | 1/2014 | Ramakrishna | .......... | G06F 13/14 710/110 |
| 2014/0068125 | A1 * | 3/2014 | Pullagoundapatti | | G06F 13/1663 710/110 |
| 2014/0173147 | A1 * | 6/2014 | Grafton | ................. | G06F 13/385 710/110 |
| 2014/0173345 | A1 * | 6/2014 | Gorti | ...................... | G11C 29/16 714/30 |
| 2015/0170762 | A1 * | 6/2015 | Nirschl | ............... | G06F 11/1076 714/768 |
| 2015/0234702 | A1 * | 8/2015 | Walton | ................ | G06F 11/0793 714/6.13 |
| 2015/0378959 | A1 * | 12/2015 | Jones | .................. | G06F 13/4291 714/5.11 |
| 2016/0062911 | A1 * | 3/2016 | Kegel | .................... | G06F 12/1081 710/308 |
| 2016/0170927 | A1 * | 6/2016 | Bubb | .................. | G06F 13/4282 710/110 |
| 2016/0283299 | A1 * | 9/2016 | Zerdoum | ................ | G06F 13/00 |

OTHER PUBLICATIONS

"KeyStone Architecture Serial Peripheral Interface (SPI) User Guide", Texas Instruments, Mar. 2012, 51 pages.

* cited by examiner

APPARATUS AND METHOD FOR FAULT DETECTION TO ENSURE DEVICE INDEPENDENCE ON A BUS

TECHNICAL FIELD

This disclosure relates generally to data communications. More specifically, this disclosure relates to an apparatus and method for fault detection to ensure device independence on a bus, such as a Serial Peripheral Interface (SPI) bus.

BACKGROUND

Communication systems are routinely used to exchange data between devices. Some small or low-cost communication systems do not use acknowledgement messages during data communications, so a transmitting device is often unable to confirm whether a receiving device receives a particular data transmission. Also, when multiple devices communicate using a common bus, a receiving device is often unable to verify which device initiated a data transmission.

SUMMARY

This disclosure provides an apparatus and method for fault detection to ensure device independence on a bus, such as a Serial Peripheral Interface (SPI) bus.

In a first embodiment, a method includes transmitting a first value to a first slave device via a communication bus, where the first value is within a first range of values associated with the first slave device. The method also includes receiving a second value via the communication bus and detecting a fault when the second value is not within the first range of values associated with the first slave device.

In a second embodiment, an apparatus includes a master device configured to be coupled to a communication bus and to communicate with a first slave device via the communication bus. The master device includes a fault detector configured to transmit a first value to the first slave device via the communication bus, where the first value is within a first range of values associated with the first slave device. The fault detector is also configured to receive a second value via the communication bus and detect a fault when the second value is not within the first range of values associated with the first slave device.

In a third embodiment, a non-transitory computer readable medium embodies a computer program. The computer program includes instructions that when executed cause a fault detector to transmit a first value to a first slave device via a communication bus, where the first value is within a first range of values associated with the first slave device. The computer program also includes instructions that when executed cause the fault detector to receive a second value via the communication bus and detect a fault when the second value is not within the first range of values associated with the first slave device.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

A communication bus is routinely used to transport data between different devices. For example, many systems use a Serial Peripheral Interface (SPI) bus so that a single master device can read data from and write data to multiple slave devices connected to the bus. When an SPI bus is used, the single master device can often use a single "slave select" signal to access a particular slave device. The master device could denote at least one processing device, and the slave devices can include memory devices, sensors, or other devices. As particular examples, the slave devices could include secure digital (SD) cards, Flash memory, Electrically Erasable Programmable Read-Only Memory (EEPROM), a liquid crystal display (LCD), an air data computer (ADC), a digital-to-analog converter (DAC), temperature sensors, pressure sensors, or the like.

In some systems where access throughput between master and slave devices is important, data exchanges between these devices need to be efficient. Unfortunately, when the master device initiates access to a particular slave device and any slave device responds, the master device may be unable to determine if the correct slave device has responded.

SPI buses are often implemented when small-footprint or low-cost bus systems are needed. SPI buses are typically used for short data communication distances with a single master device communicating with one or more slave devices using a slave select (SS) line. However, a slave device typically provides no acknowledgement to a master device after receiving data from the master device. Because of this, the master device is not able to confirm that an intended slave device actually receives transmitted data. Moreover, slave devices typically provide no acknowledgement when transmitting data to a master device. Thus, in a system with multiple slave devices, the master device is unable to verify whether a particular slave device is actually the slave device that transmits data. In addition, SPI buses generally have no defined error checking protocols.

In systems that include SPI buses, embedded components and hardware may fail or may fail to operate as intended. As a result, any fault on the SPI bus that is not detected could cause a master device to receive erroneous data. Critical applications (such as industrial process control and automation applications) generally do not use SPI buses because too much risk is associated with the SPI buses for use with necessary or critical functions. Instead, costlier and more elaborate systems are often implemented for such applications.

Figure 1:
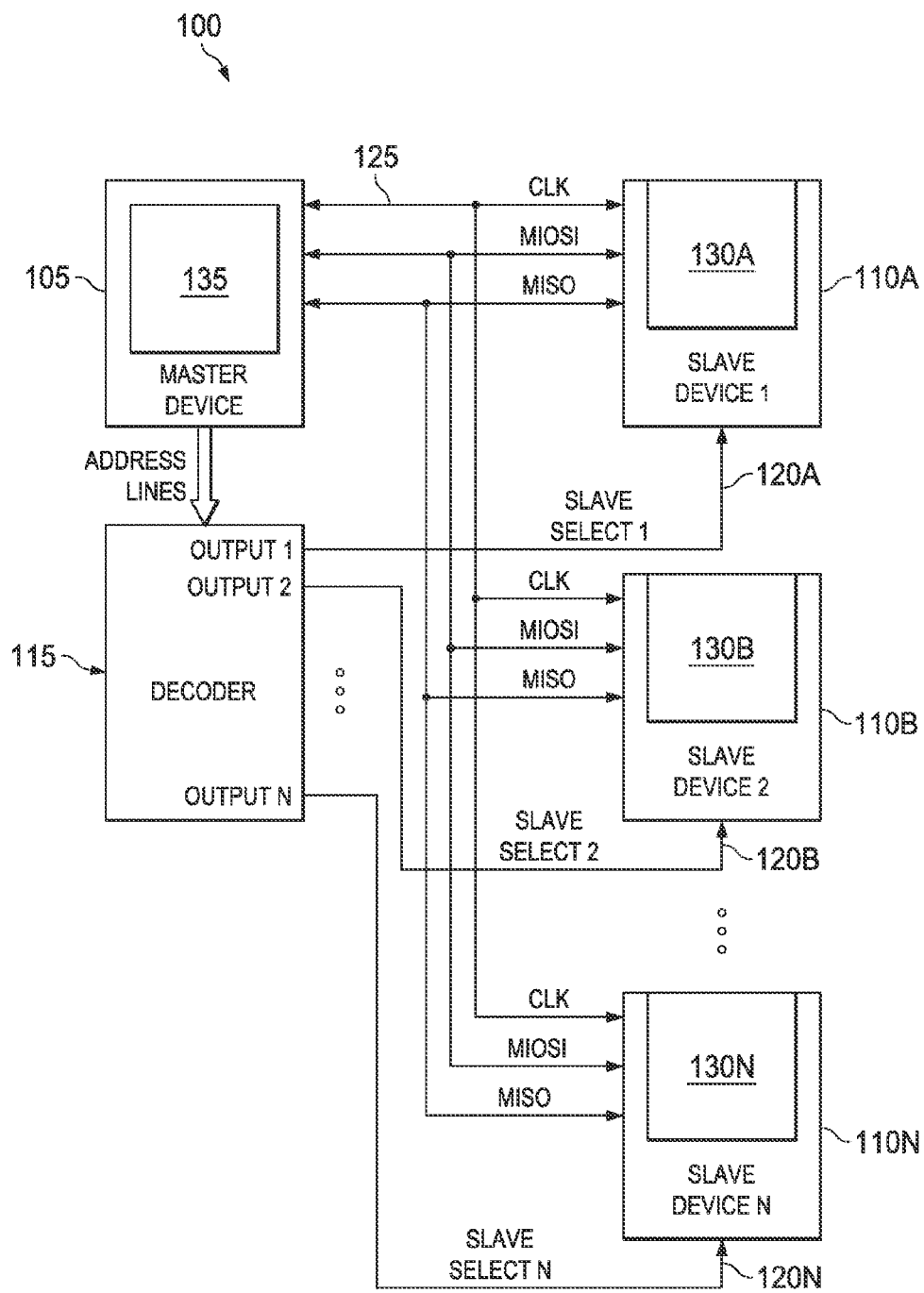
FIG. 1 illustrates an example system supporting fault detection to ensure device independence on a bus according to this disclosure.

FIG. 1 illustrates an example system 100 supporting fault detection to ensure device independence on a bus according to this disclosure. As shown in FIG. 1, the system 100 includes a master device 105, one or more slave devices 110A-110N, and a decoder 115. The decoder 115 generates outputs on various slave select (SS) signal lines 120A-120N based on inputs from the master device 105. The master device 105 also communicates with the slave devices 110A-110N via additional signal lines 125, which are used to transport clock (CLK) signals, master output slave input (MOSI) signals, and master input slave output (MISO) signals. The signal lines 120A-120N, 125 collectively form a bus in the system 100.

Suppose the decoder 115 develops a fault so that the output providing a signal on the SS signal line 120B is activated whenever the master device 105 attempts to access the slave device 110A. The master device 105 will receive signals from the slave device 110B via the signal lines 125 and act on those signals as if those signals originate from the slave device 110A. This erroneous behavior could continue as long as the fault is present and undetected.

This disclosure provides a fault detection technique that can be used with an SPI bus or other bus system. The fault detection technique is used to identify at the master device 105 which slave device 110A-110N receives or transmits data over the signal lines 125. To support this fault detection technique, each slave device 110A-110N is associated with an invalid slave access detection (ISAD) location 130A-130N. Each ISAD location 130A-130N can be designated (such as established or agreed to) by the master device 105 in the corresponding slave device 110A-110N. The ISAD locations 130A-130N denote memory locations that are within the slave devices 110A-110N and that are capable of being read from or written to by the master device 105. In some embodiments, the master device 105 designates one ISAD location 130A-130N for each slave device 110A-110N.

The master device 105 also includes or implements a fault detector 135. As described in more detail below, the fault detector 135 assigns a range of values to the ISAD locations 130A-130N and performs diagnostic tests to detect faults associated with the bus system. For example, the fault detector 135 can assign the ISAD location 130A of the slave device 110A with a range of 1 to 100, the ISAD location 130B of the slave device 110B with a range of 101 to 200, and so on. During a diagnostic test, the fault detector 135 writes a different value to each ISAD location 130A-130N and reads the value from each ISAD location 130A-130N, where the value written to each ISAD location 130A-130N falls within the range assigned to that ISAD location 130A-130N. The fault detector 135 can then verify whether the value returned during an attempted read from each ISAD location 130A-130N actually falls within the range assigned to that ISAD location 130A-130N. If, for example, the slave device 110B returns its value during an attempted read of the ISAD location 130A, the fault detector 135 can identify the fault. The fault detector 135 receives a return value from each of the ISAD locations 130A-130N that is equal to a value previously written into each of the ISAD locations 130A-130N by the fault detector 135, which identifies that no fault exists with each of the respective slave devices 110A-110N.

The fault detector 135 includes any suitable structure for writing values to specified locations, reading values from specified locations, and comparing values. For example, the fault detector 135 could be implemented using hardware or a combination of hardware and software/firmware instructions. As a particular example, when the master device 105 is implemented using at least one processing device, the fault detector 135 could be implemented using a computer program that is executed by the processing device(s). Note that the diagnostic testing of the bus could occur at specified intervals, during times when the bus is not otherwise in use, when a fault is possible (such as in response to receiving unexpected data from a slave device or failing to receive data from a slave device), or at any other suitable predetermined or random time(s).

Although FIG. 1 illustrates one example of a system 100 supporting fault detection to ensure device independence on a bus, various changes may be made to FIG. 1. For example, various components in FIG. 1 could be combined, subdivided, or omitted and additional components could be added according to particular needs. Also, note that while shown and described as being used with an SPI bus, the fault detection technique disclosed in this patent document could be used with other types of communication buses such as a I2C (Inter-integrated Circuit) bus or the like.

Figure 2:
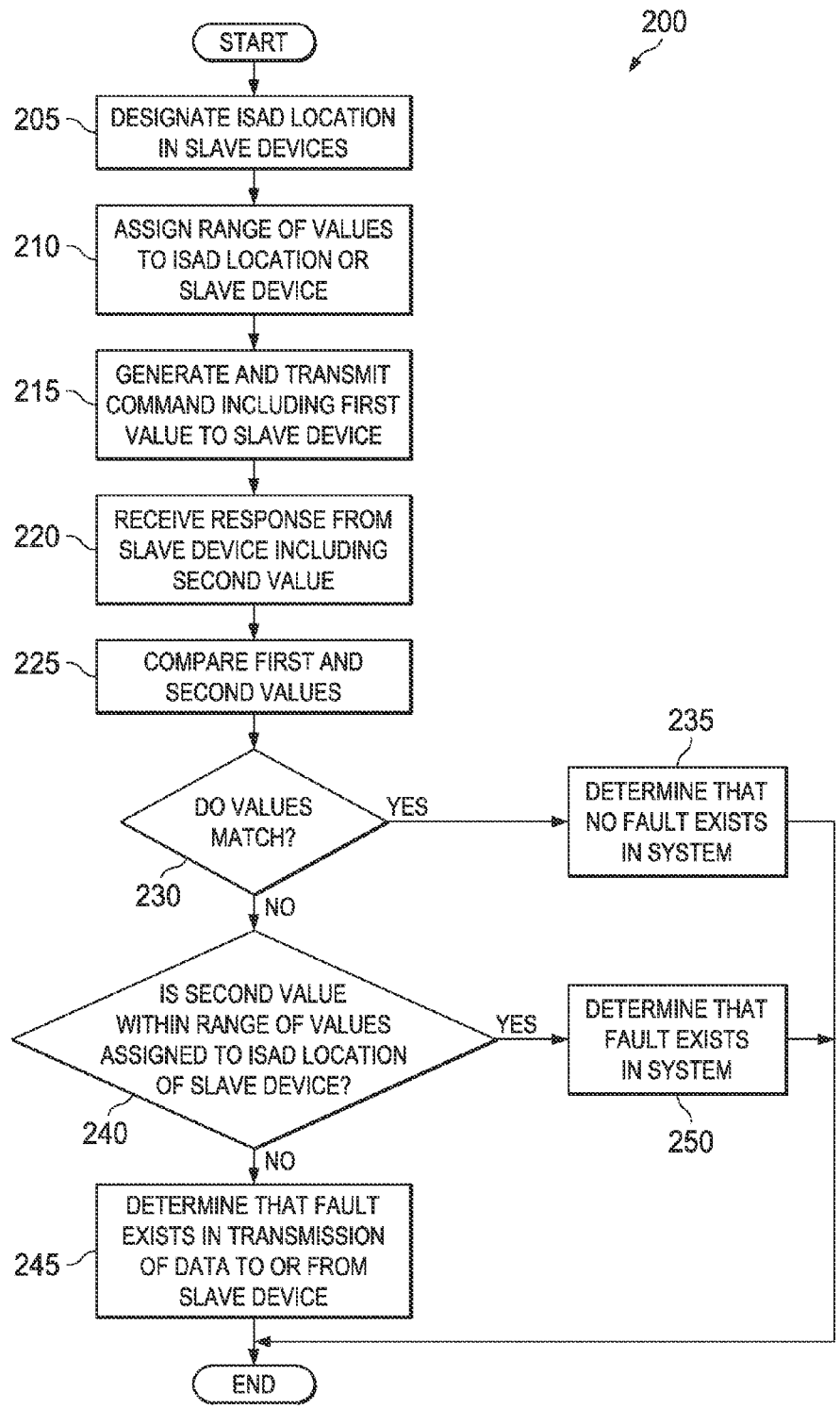
FIGS. 2 through 3C illustrate an example method for fault detection to ensure device independence on a bus and related details according to this disclosure.
Figure 3A:
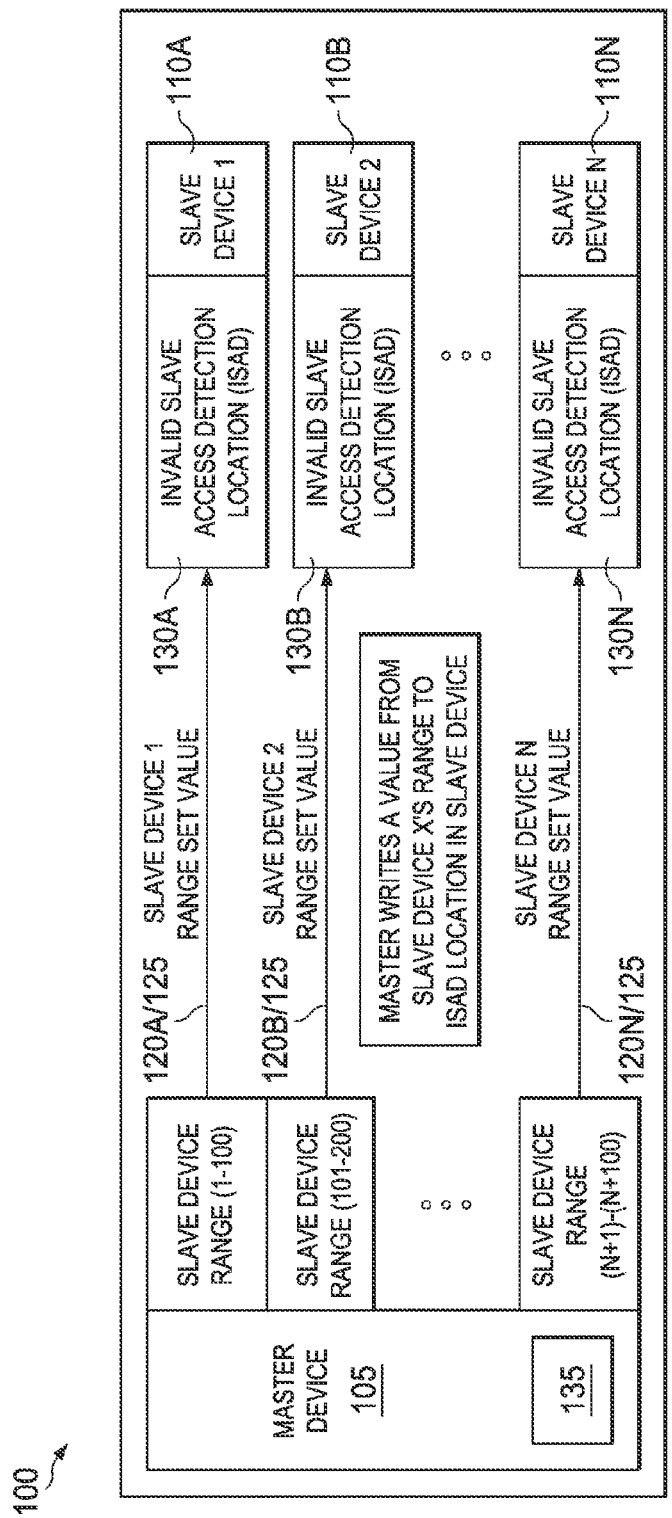
Figure 3B:
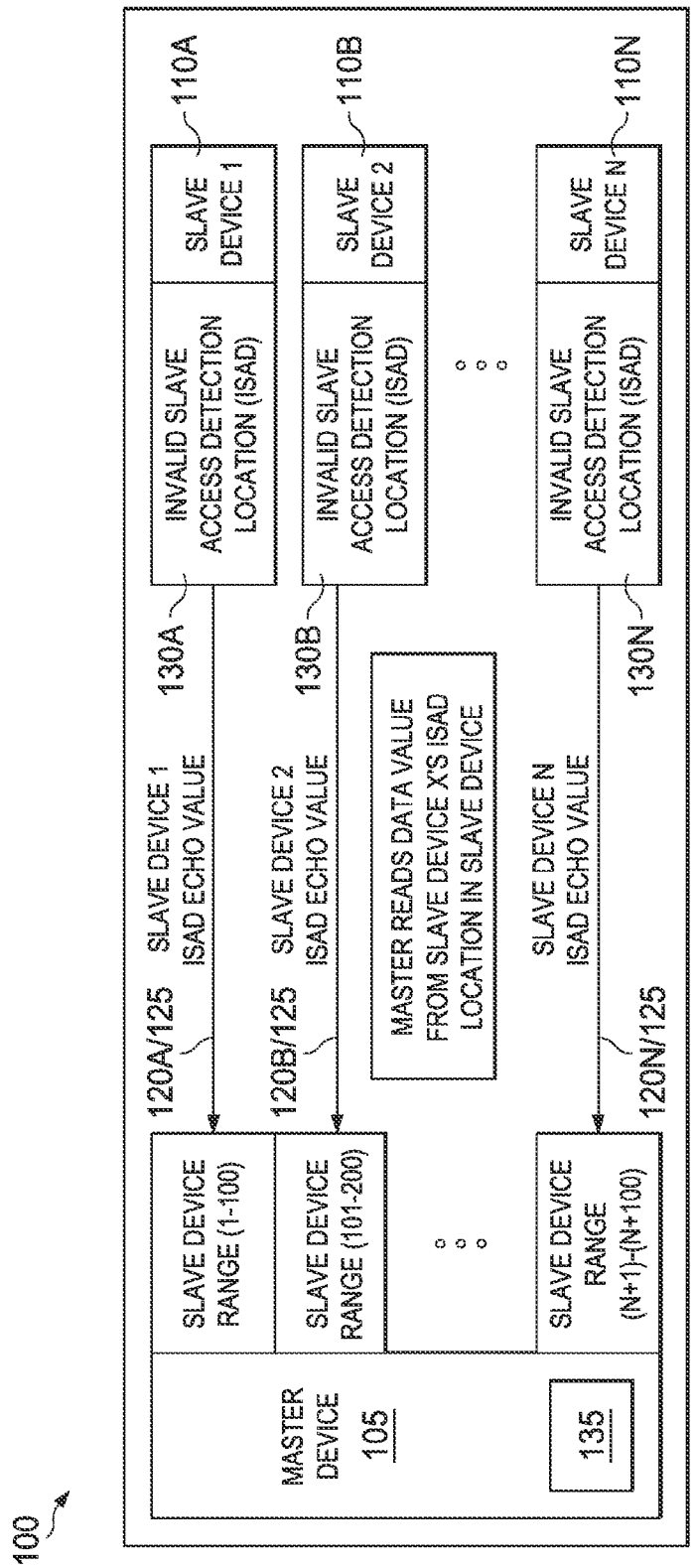
Figure 3C:
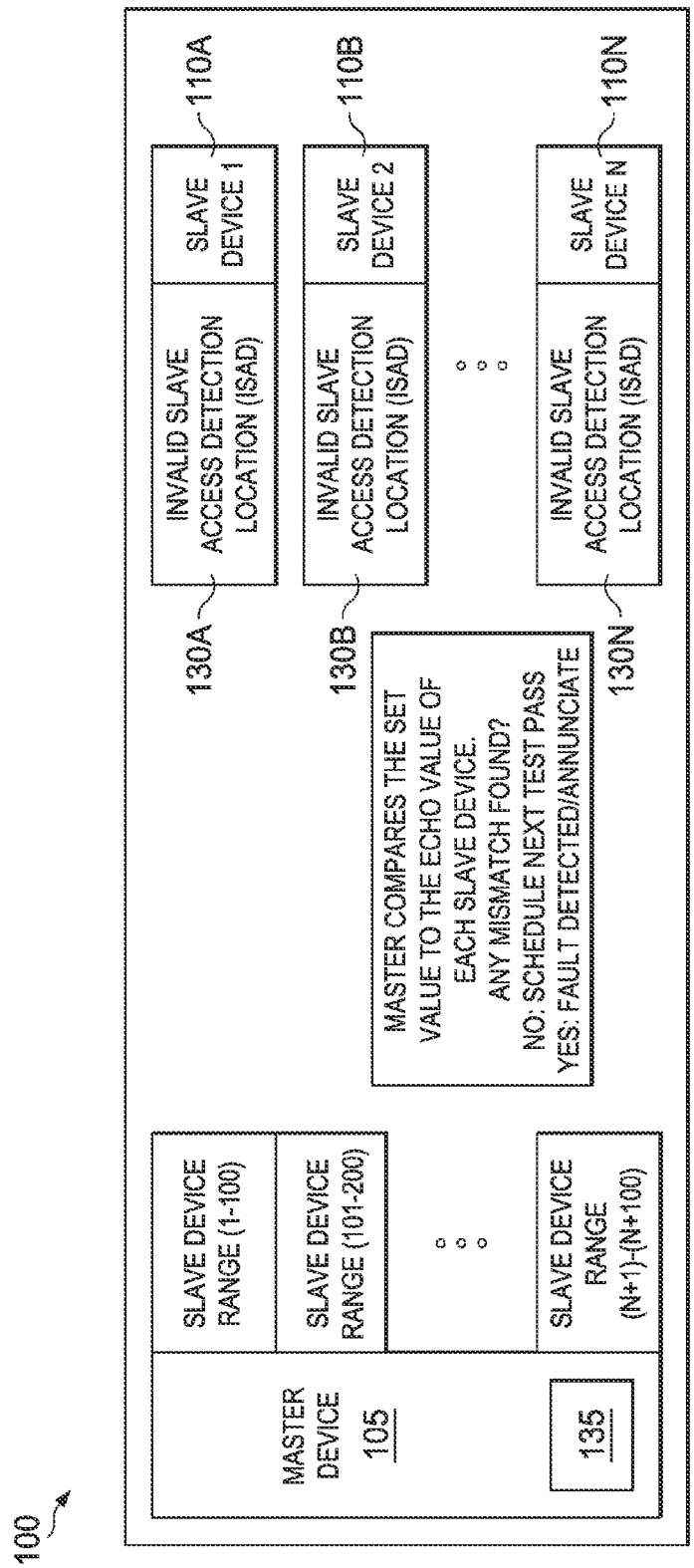

FIGS. 2 through 3C illustrate an example method 200 for fault detection to ensure device independence on a bus and related details according to this disclosure. In particular, FIG. 2 illustrates the example method 200 for fault detection, and FIGS. 3A through 3C illustrate example operations performed during the method 200. For ease of explanation, the method 200 is described as being used in the system 100 of FIG. 1. However, the method 200 could be used in any suitable system and with any suitable bus.

As shown in FIG. 2, an ISAD location is designated in a slave device at step 205. For example, the ISAD is defined or established between the master device 105 and potential slave device 110A-110N. This could include, for example, the master device 105 or the fault detector 135 designating an ISAD location 130A-130N in the memory space of a slave device 110A-110N. A range of values is assigned to the ISAD location or slave device at step 210. This could include, for example, the master device 105 or the fault detector 135 assigning a range of integer values to the ISAD location 130A-130N. Note that non-overlapping ranges of values can be assigned to different slave devices and that values other than integers could be used.

A command including a first value is generated and transmitted to the slave device at step 215. This could include, for example, the master device 105 or the fault detector 135 sending a command that attempts to write the first value into the ISAD location 130A-130N of the slave device 110A-110N, where the value falls within the range of values assigned to that slave device's ISAD location. An example of this is shown in FIG. 3A, where the master device 105 or the fault detector 135 generates "range set value" commands that attempt to write values into the slave devices' ISAD locations. In some embodiments, the first value represents an integer value.

A response including a second value is received at step 220. This could include, for example, the slave device 110A-110N reading the value from its ISAD location 130A-130N and providing a response to the master device 105 or the fault detector 135 containing the read value. An example of this is shown in FIG. 3B, where each slave device 110A-110N provides an "echo value" response to the master device 105 or the fault detector 135. In some embodiments, the second value represents an integer value.

A comparison is made of the first and second values at step 225, and a determination is made whether the values match at step 230. This could include, for example, the master device 105 or the fault detector 135 comparing the first value transmitted to the slave device 110A-110N and the second value (allegedly) returned from that slave device 110A-110N. This comparison is shown in FIG. 3C. If the first and second values match, a determination is made that no fault exists with that slave device at step 235. In this case, the first value assigned to the slave device was successfully written into the slave device's ISAD location, read from the slave device's ISAD location, and returned as the slave device's second value.

However, if the first and second values do not match, there is potentially a fault. A determination is made whether the second value from the slave device is within the range of values assigned to that slave device at step 240. If so, a determination is made that a fault exists in the transmission of data to or from the slave device at step 245. Here, the fact that the second value from the slave device falls within the expected range of values assigned to that slave device means the slave device appears to be operating properly. As a result, the first and second values' failure to match may be due to a transmission problem. Otherwise, a determination is made that a fault exists in the system at step 250. Here, the fact that the second value falls outside the expected range of values assigned to the slave device can mean that the wrong slave device responded or that the right slave device responded but is malfunctioning. As a particular example, the decoder 115 could have a fault such the decoder 115 activates the wrong output and transmits a signal intended for one slave device to an incorrect slave device.

The master device 105 or the fault detector 135 can perform the method 200 repeatedly for different slave devices. Note that each slave device could be tested serially separately, or the testing of multiple slave devices could overlap. However, the diagnostic testing is performed, this approach allows the master device 105 or the fault detector 135 to detect various issues with a bus system. For example, this approach can be used to confirm that (i) each slave device is able to receive data from a master device and (ii) the correct slave device responds to the master device.

As a particular example of this testing, the fault detector 135 can assign the ISAD location 130A of the slave device 110A with a range of 1 to 100, the ISAD location 130B of the slave device 110B with a range of 101 to 200, and so on. During a diagnostic test, the master device 105 or fault detector 135 can write values of 1, 101, 201, and so on to the slave devices 110A-110N and attempt to read the values. During a subsequent iteration, the master device 105 or fault detector 135 can write values of 2, 102, 202, and so on to the slave devices 110A-110N and attempt to read the values. During a third iteration, the master device 105 or fault detector 135 can write values of 3, 103, 203, and so on to the slave devices 110A-110N and attempt to read the values. Because each slave device has a known range of values, the master device 105 or fault detector 135 can verify whether a response is received from a correct slave device.

Note that while not shown, additional faults can be detected based on responses or non-responses from a slave device. For example, a fault can be detected when a slave device fails to respond altogether. Another fault with a particular slave device can be detected when that slave device returns a value equal to the value returned in a prior response, meaning the slave device is stuck on a particular value and is unable to provide the next value(s). In the preceding example, if the slave device 110B returns the value 101 after receiving values of 102 and 103, a fault can be detected with the slave device 110B. Any other or additional logic can be used to identify faults associated with a bus system.

Although FIGS. 2 through 3C illustrate one example of a method 200 for fault detection to ensure device independence on a bus and related details, various changes may be made to FIGS. 2 through 3C. For example, while shown as a series of steps, various steps in FIG. 2 could overlap, occur in parallel, occur in a different order, or occur any number of times. Also, FIGS. 3A through 3C could have any combination of the features shown in FIG. 1, such as when a feature shown in one figure is used in another figure. In addition, various components in FIGS. 3A through 3C could be combined, subdivided, or omitted and additional components could be added according to particular needs.

Figure 4:
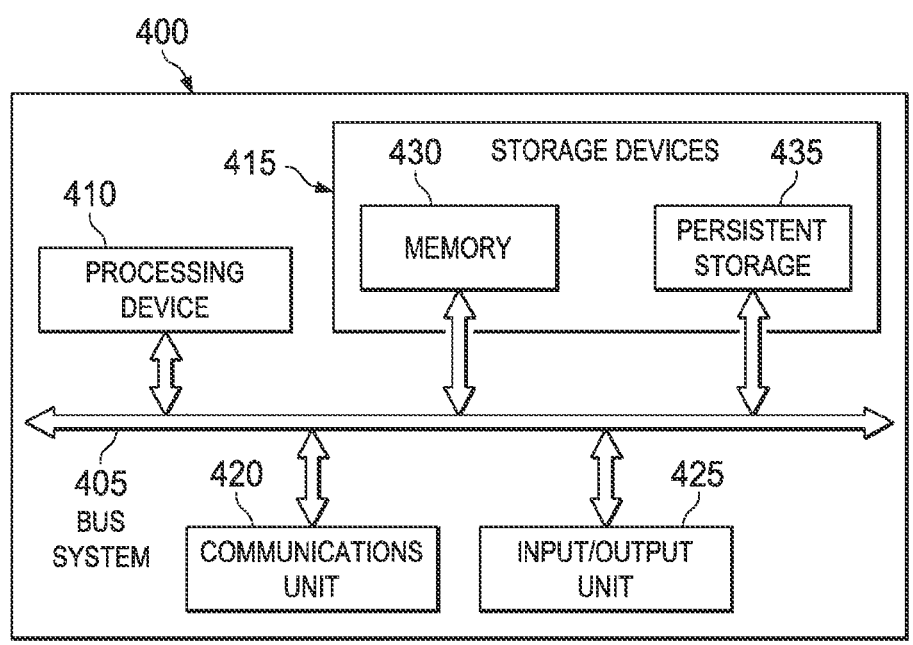
FIG. 4 illustrates an example device for implementing fault detection to ensure device independence on a bus according to this disclosure.

FIG. 4 illustrates an example device 400 for implementing fault detection to ensure device independence on a bus according to this disclosure. In this example, the fault detection is implemented within a computing device. The computing device could be used as a process controller, operator station, or other device in an industrial process control and automation system. However, the device 400 could be used in any other suitable manner.

As shown in FIG. 4, the device 400 includes a bus system 405, which supports communication between at least one processing device 410, at least one storage device 415, at least one communications unit 420, and at least one input/output (I/O) unit 425. The bus system 405 supports any suitable communication bus, such as an SPI bus.

The processing device 410 executes instructions that may be loaded into a memory 430. The processing device 410 may include any suitable number(s) and type(s) of processors or other devices in any suitable arrangement. Example types of processing devices 410 include microprocessors, microcontrollers, digital signal processors, field programmable gate arrays, application specific integrated circuits, processing circuitry, and discrete circuitry.

The memory 430 and a persistent storage 435 are examples of storage devices 415, which represent any structure(s) capable of storing and facilitating retrieval of information (such as data, program code, and/or other suitable information on a temporary or permanent basis). The memory 430 may represent a random access memory or any other suitable volatile or non-volatile storage device(s). The persistent storage 435 may contain one or more components or devices supporting longer-term storage of data, such as a ready only memory, hard drive, Flash memory, or optical disc.

The communications unit 420 supports communications with other systems or devices. For example, the communications unit 420 could include a network interface card or a wireless transceiver facilitating communications over a network. The communications unit 420 may support communications through any suitable physical or wireless communication link(s).

The I/O unit 425 allows for input and output of data. For example, the I/O unit 425 may provide a connection for user input through a keyboard, mouse, keypad, touchscreen, or other suitable input device. The I/O unit 425 may also send output to a display, printer, or other suitable output device.

In some embodiments, the processing device 410 represents the master device 105 for the bus system 405 and can implement the fault detector 135. In these embodiments, one or more other devices or components coupled to the bus system 405 could denote the slave device(s) 110A-110N. In other embodiments, the processing device 410 could denote a slave device, and another component coupled to the bus system 405 could denote the master device.

Although FIG. 4 illustrates one example of a device 400 for implementing fault detection to ensure device independence on a bus, various changes may be made to FIG. 4. For example, various components in FIG. 4 could be combined, further subdivided, or omitted and additional components could be added according to particular needs. Also, computing devices can come in a wide variety of configurations, and FIG. 4 does not limit this disclosure to any particular configuration of computing device.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
designating by a master device, an access detection location in a memory of each of a plurality of slave devices, the master device communicably coupled to the slave devices via a Serial Peripheral (SPI) bus;
assigning by the master device, a range of values to each slave device such that each slave device stores the range of values in the designated access detection location in the memory of the each slave device, wherein the range of values assigned to each slave device does not overlap with the range of values assigned to any other slave device;
transmitting a first value to a first slave device among the plurality of slave device via the SPI bus, the first value within a first range of values stored in the designated access detection location of the first slave device;
receiving a second value via the SPI bus; and
detecting a fault, in the first slave device when the second value is not within the first range of values stored in the designated access detection location of the first slave device, or in the transmission when the second value is within the first range of values stored in the designated access detection location of the first slave device.

2. The method of claim 1, wherein detecting the fault comprises detecting a decoder fault when the second value is within a second range of values stored in the designated access detection location of a second slave device among the plurality of slave devices.

3. The method of claim 1, further comprising:
detecting a fault when the second value is within the first range of values stored in the memory of the first slave device but does not equal the first value.

4. The method of claim 3, further comprising:
detecting no fault when the second value equals the first value.

5. The method of claim 1, further comprising:
transmitting a third value to a second slave device among the plurality of slave devices via the SPI bus, the third value within a second range of values stored in the designated access detection location of the second slave device;
receiving a fourth value via the communication bus; and
detecting a fault when the fourth value is not within the second range of values stored in the designated access detection location second slave device.

6. The method of claim 1, wherein the first and second values represent integer values.

7. The method of claim 1, wherein the first value is transmitted to the first slave device as part of a command that attempts to write one or more values to the designated access detection location of the first slave device.

8. An apparatus comprising:
a master device configured to be coupled to a Serial Peripheral Interface (SPI) bus and to communicate with a plurality of slave devices via the SPI bus;
each of the slave devices comprising a memory,
wherein the master device comprises at least one processing device configured to:
designate an access detection location in the memory of each slave device;
assign a range of values to each slave device such that each slave device stores the range of values in the designated access location in the memory of each slave device, wherein the range of values assigned to each slave device does not overlap with the range of values assigned to any other slave device;
transmit a first value to a first slave device among plurality of slave devices via the SPI bus, the first value within a first range of values stored in the designated access detection location of the first slave device;
receive a second value via the SPI bus; and
detect a fault, in the first slave device when the second value is not within the first range of values stored in the designated access detection location of the first slave device, or in the transmission when the second value is within the first range of values stored in the designated access detection location of the first slave device.

9. The apparatus of claim 8, wherein the atleast one processing device is configured to detect a decoder fault when the second value is within a second range of values stored in the designated access detection location of a second slave device among plurality of slave devices.

10. The apparatus of claim 8, wherein the atleast one processing device is further configured to detect a fault when the second value is within the first range of values stored in the designated access detection location of the first slave device but does not equal the first value.

11. The apparatus of claim 10, wherein the atleast one processing device is further configured to detect no fault when the second value equals the first value.

12. The apparatus of claim 8, wherein the atleast one processing device is further configured to:
   transmit a third value to a second slave device among plurality of slave devices via the SPI bus, the third value within a second range of values stored in the designated access detection location of the second slave device; receive a fourth value via the SPI bus;
   and detect a fault when the fourth value is not within the second range of values stored in the designated access detection location of the second slave device.

13. The apparatus of claim 8, wherein the first and second values represent integer values.

14. The apparatus of claim 8, wherein the at least one processing device is configured to transmit the first value to the first slave device as part of a command that attempts to write one or more values to the designated access detection location of the first slave device.

15. A non-transitory computer readable medium embodying a computer program comprising instructions that when executed cause atleast one processing device to:
   designate an access detection location in a memory of each of a plurality of slave devices, the slave devices communicably coupled to a master device via a Serial Peripheral Interface (SPI) bus;
   assign a range of values to each slave device such that each slave device stores the range of values in the designated access detection location in the memory of the each slave device, wherein the range of values assigned to each slave device does not overlap with the range of value assigned to any other slave device;
   transmit a first value to a first slave device among the plurality of slave devices via a SPI bus, the first value within a first range of values stored in the designated access detection location of the first slave device;
   receive a second value via the SPI bus; and
   detect a fault, in the first slave device when the second value is not within the first range of values stored in the designated access detection location of the first slave device, or in the transmission when the second value is within the first range of values stored in the designated access detection location of the first slave device.

16. The non-transitory computer readable medium of claim 15, wherein the instructions that when executed cause the atleast one processing device to detect the fault comprise:
   instructions that when executed cause the atleast one processing device to detect a decoder fault when the second value is within a second range of values stored in the designated access detection location of a second slave device among plurality of slave devices.

17. The non-transitory computer readable medium of claim 15, wherein the computer program further comprises instructions that when executed cause the atleast one processing device to:
   detect a fault when the second value is within the first range of values stored in the designated access detection location of the first slave device but does not equal the first value.

18. The non-transitory computer readable medium of claim 17, wherein the computer program further comprises instructions that when executed cause the atleast one processing device to:
   detect no fault when the second value equals the first value.

19. The non-transitory computer readable medium of claim 15, wherein the computer program further comprises instructions that when executed cause the atleast one processing device to:
   transmit a third value to a second slave device among plurality of slave devices via the SPI bus, the third value within a second range of values stored in the designated access detection location of the second slave device;
   receive a fourth value via the SPI bus; and
   detect a fault when the fourth value is not within the second range of values stored in the designated access detection location of the second slave device.

20. The non-transitory computer readable medium of claim 15, wherein the first value is transmitted to the first slave device as part of a command that attempts to write one or more values to designated access location of the first slave device.

* * * * *